United States Patent [19]

Stirland

[11] 4,007,649
[45] Feb. 15, 1977

[54] TRANSMISSION ASSEMBLY

[76] Inventor: Harry Stirland, 'Poplars', Fosse Road, Colston, Nottinghamshire, England

[22] Filed: May 1, 1975

[21] Appl. No.: 573,801

[30] Foreign Application Priority Data

May 2, 1974 United Kingdom ............ 19400/74

[52] U.S. Cl. ................................................ 74/803
[51] Int. Cl.² ........................................ F16H 1/28
[58] Field of Search ............ 74/412, 421, 810, 793, 74/751, 801, 803

[56] References Cited

UNITED STATES PATENTS

| | | | |
|---|---|---|---|
| 1,764,961 | 6/1930 | Kittilsen | 74/751 |
| 2,091,391 | 8/1937 | Hale | 74/751 |
| 2,188,246 | 1/1940 | Mirone | 74/751 |
| 2,296,532 | 9/1942 | Mekeel, Jr. | 74/751 |
| 2,320,854 | 6/1943 | Dethridge | 74/751 |
| 2,667,089 | 1/1954 | Gregory | 74/793 |
| 2,668,459 | 2/1954 | Berklege | 74/751 |
| 2,941,421 | 6/1960 | Plotti | 74/793 |
| 3,222,984 | 12/1965 | Wuertz | 74/801 |
| 3,893,352 | 7/1975 | Cotton | 74/793 |
| 3,905,253 | 9/1975 | Stirland | 74/801 |

Primary Examiner—C. J. Husar
Attorney, Agent, or Firm—Paul & Paul

[57] ABSTRACT

A transmission assembly for providing an infinitely variable gearing between an input and take-off shaft, the gearing ratio achieved being dependent on the load applied to the take-off shaft. The assembly comprises a first gear mounted on the input shaft, a second gear mounted on the take-off shaft, a control gear rotatable, located between the first and second gears and a first gear train providing a driving connection between the first gear and control gear and a second gear train providing a driving connection between the control gear and the second gear, the gear train being rotatably mounted in a gear carrying member rotatably carried on the input and take-off shafts. The gear trains are arranged to induce opposing torques on to the control gear and the gear sizes are such as to provide a step down from the first gear to the control gear and a greater step up from the control gear to the second gear.

16 Claims, 2 Drawing Figures

TRANSMISSION ASSEMBLY

BACKGROUND OF INVENTION

A similar transmission assembly is disclosed in my U.S. patent application Ser. No. 349,753, filed Apr. 10, 1973, now U.S. Pat. No. 3,905,253, issued Sept. 16, 1975, in which there is provided a transmission assembly comprising an input shaft; a take-off shaft in co-axial alignment with said input shaft; a first gear fixedly mounted on said input shaft and in co-axial alignment therewith; a second gear fixedly mounted on said take-off shaft and in co-axial alignment therewith; a transmission element rotatably mounted on said input and take-off shafts; at least one gearing arrangement rotatably carried by said transmission element, each at least one gearing arrangement meshing with said first and second gears; restraining means for controlling the rate of rotation of said transmission element so as to regulate the speed of rotation of said take-off shaft; wherein said restraining means comprises an additional gearing assembly including at least one further gearing arrangement rotatably mounted in said transmission element, the additional gearing assembly being adapted to develop a torque to approximate the rotation of the transmission element; a third gear fixedly mounted on said takeoff shaft in co-axial alignment therewith; a fourth gear fixedly mounted on an output shaft in co-axial alignment therewith; said transmission element being rotatably mounted on said input, take-off, and output shafts respectively; and each further gearing arrangement being similar to said at least one gearing arrangement and serving to provide a driving connection between said third and fourth gears.

The above transmission assembly has some drawbacks in that the speed of rotation of the gear carrying member during use is very high and also since the member rotates in an opposite direction to the input shaft a condition of direct drive through the member cannot be achieved. Additionally, it is not possible to obtain a condition of neutral wherein the input solely drives the gear carrying member resulting in the take-off shaft remaining stationary.

It is a general object of the present invention to overcome the above drawbacks.

SUMMARY OF THE INVENTION

In accordance with the present invention there is provided a transmission assembly comprising an input shaft and a take-off shaft in co-axial alignment, a gear carrying member rotatably mounted on the input and take-off shafts, a first gear fixedly mounted on the input shaft and a second gear fixedly mounted on the take-off shaft, a control gear co-axial with the input shaft and rotatably relative thereto, a first gear train rotatably carried by the gear carrying member and arranged to provide a driving connection between the first gear and the control gear and a second gear train rotatably carried by the gear carrying member and arranged to provide a driving connection between the control gear and the second gear, the first and second gear trains being arranged to rotate the gear carrying member in opposite directions for a given direction of rotation of the input shaft, the first gear, first gear train and control gear being so sized to form a step down in rotational speed from the first gear to the control gear, and the control gear, second gear train and second gear being so sized to form a step up in rotational speed from the control gear to the second gear, the gear sizes being such that the amount of step up is greater than the amount of step down, the arrangement being such that for a given speed of rotation of the input shaft the assembly automatically adjusts the speed of rotation of the take-off shaft between a maximum and a minimum speed of revolution in accordance with load applied to the take-off shaft.

The invention also seeks to provide a transmission assembly for a motor powered vehicle comprising an input shaft for connection to the motor and a take-off shaft for connection to the driven shaft of the vehicle, the take-off shaft being in co-axial alignment with the input shaft, a gear carrying member rotatably mounted on the input and take-off shafts, a first gear fixedly mounted on the input shaft and a second gear fixedly mounted on the take-off shaft, a control gear co-axial with the input shaft and rotatable relative thereto, a first gear train rotatably carried by the gear carrying member and arranged to provide a driving connection between the first gear and the control gear and a second gear train rotatably carried by the gear carrying member and arranged to provide a driving connection between the control gear and the second gear, the first and second gear trains being arranged to rotate the gear carrying member in opposite directions for a given direction of rotation of the input shaft, the first gear, first gear train and control gear being so sized to form a step down in rotational speed from the first gear to the control gear, and the control gear, second gear train and second gear being so sized to form a step up on rotational speed from the control gear to the second gear, the gear sizes being such that the amount of step up is greater than the amount of step down, the arrangement being such that for a given speed of rotation of the input shaft the assembly automatically adjusts the speed of rotation of the take-off shaft between a maximum and a minimum speed of revolution in accordance with load applied to the take-off shaft.

BRIEF DESCRIPTION OF THE DRAWINGS

Reference is now made to the accompanying drawings in which.

DETAILED DESCRIPTION

Figure 1:
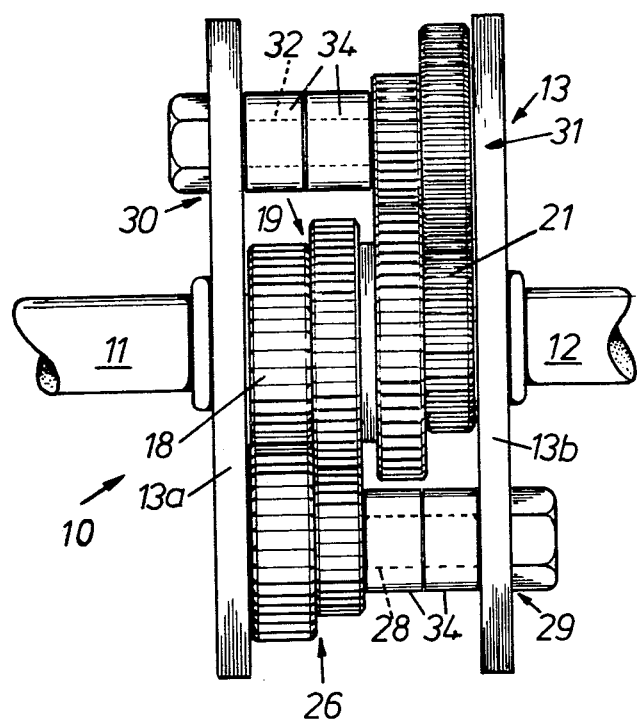
FIG. 1 is a side elevational view of the transmission assembly.

With reference to the drawings, the transmission assembly is generally shown at 10. The assembly 10 includes an input shaft 11, a take-off shaft 12 in co-axial alignment with the input shaft 11 and a gear carrying member or casing 13 rotatably received on the input and take-off shafts by means of bearings 16 and 17.

Figure 2:
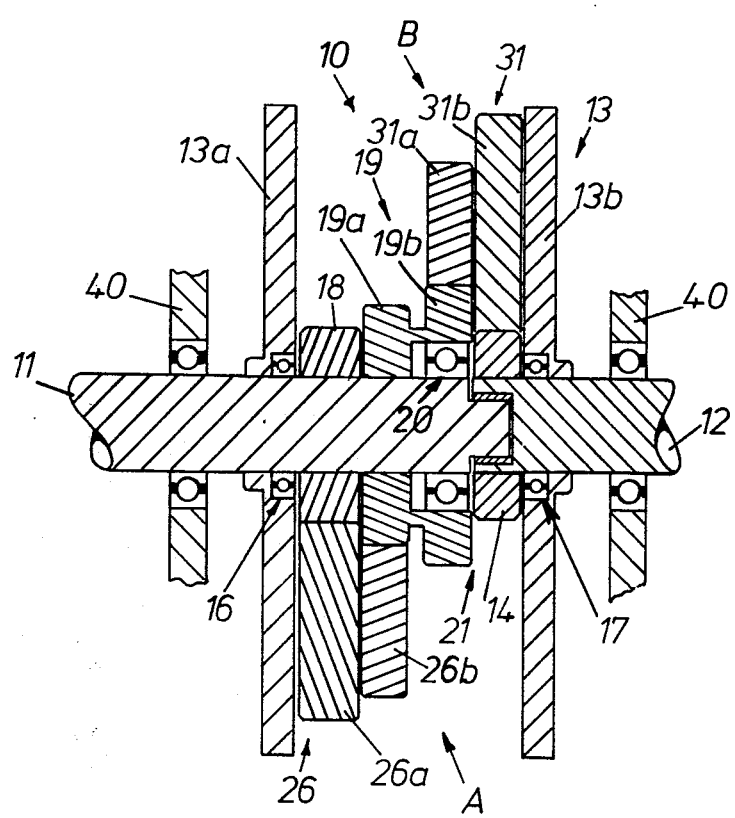
FIG. 2 is a schematic side elevational view in section of the assembly of FIG. 1 including part of the assembly housing.

As clearly seen in FIG. 2, an end of the input shaft 11 is located within a journal bearing 14 formed in an end of the take-off shaft 12.

A first gear 18 is fixedly mounted on the input shaft 11 so as to be rotatable therewith, a control gear which comprises a gear cluster 19 is rotatably mounted on the input shaft 11 by means of bearing 20 and a second gear 21 is fixedly mounted in the take-off shaft 12 so as to be rotatable therewith.

The first gear 18, gear cluster 19 and second gear 21 are located between side plates 13a, 13b of the casing 13.

A first gear train A provides a driving connection between the first gear and the control gear and comprises a gear cluster 26 which is rotatably received on a shaft 28 of a bolt 29 by means of either a needle or roller bearing (not shown). The gear cluster 26 has a gear 26a in mesh with gear 18 and a gear 26b in mesh with gear 19a of the gear cluster 19.

A second gear train B provides a driving connection between the control gear and the second gear comprises a second gear cluster 31 which is rotatably received on shaft 32 of bolt 30 which is located diametrically opposite bolt 29. The second gear cluster 31 has a gear 31a in mesh with gear 19b of gear cluster 19 and a gear 31b in mesh with the second gear 21.

The bolts 29 and 30 also serve to rigidly connect plates 13a and 13b together so that they rotate together in unison. Spacing elements 34 are provided to space respective gear clusters 26 and 31 from the plates 13a and 13b. Additional bolts (not shown) may be incorporated to connect the plates 13a and 13b together.

As shown in FIG. 2, the transmission assembly may be received in a housing 40 which may completely surround the assembly 10 and may be partially filled with a suitable lubricating oil. Advantageously the gear carrying member may be provided with radially extending fins which dip into the oil and serve to scoop up oil on rotation. The sizes of the various gears are so chosen that the gear cluster 19 is driven by the input shaft 11 at a slower rotational speed when casing 13 is stationary, i.e. gear 18, 26a, 26b and 19a form a reduction gear train and that the gear cluster 19 drives the take-off shaft 12 at a greater rotational speed than the rotational speed of the gear cluster 26 and preferably at a greater rotational speed than the rotational speed of the input shaft 11 driving the gear cluster 19.

The following example of sizes of gears has been found to be suitable.

EXAMPLE 1

| Gear Numeral | Number of Teeth |
|---|---|
| 18 | 33 |
| 26a | 32 |
| 26b | 30 |
| 19a | 35 |
| 19b | 38 |
| 31a | 27 |
| 31b | 33 |
| 21 | 32 |

In the above example the pitch of teeth on all gears is the same and it is to be understood that the number of teeth on each gear quoted above may be varied as desired, whilst maintaining the same ratio of teeth between meshing gears. The number of teeth quoted above is intended to give an indication as to the relative sizes of gears.

The above example gives a maximum step up between the input shaft and take-off shaft in overdrive of about 12.5 per cent.

The operation of the assembly 10 is hereinafter described in relation to an assembly having gear sizes as listed above.

In use, the input shaft 11 rotates at substantially the same speed independent of varying loads on the output shaft 12, and the speed of the output shaft depends on the load applied thereto.

Hence, if the torque developed on the gear cluster 19 by the input shaft 11 is equal to and opposed to that created by the take-off shaft 12 on driving a work load, then a condition of direct drive prevails and the input shaft and take-off shaft rotate at the same rotational speed. In this condition, the first and second gear 18 and 21 are effectively locked together by gear clusters 19, 26 and 31 and the whole together with casing 13 rotate at input speed.

If the torque developed by the take-off shaft is less than that being developed by the input shaft then by virtue of the overall gearing step-up of gears 19b, 31a, 31b and 21, the take-off shaft is driven in the same direction at a speed greater than the input shaft and effectively a condition of "overdrive" prevails. In theory the casing should be stationary, but in practice it is induced by momentum to rotate in the same direction as the input shaft.

If the torque developed by the take-off shaft is greater than that developed by the input shaft the casing 13 is induced to rotate by the gears in the same direction as the input shaft to compensate for the difference in torque developed at gear cluster 19. The speed at which the drum is induced to rotate is dependent on the difference in torque developed at gear cluster 19, so that the greater the difference the faster the casing is made to rotate. The faster the rotation of the casing, then the greater the reduction in effective gearing between the input and take-off shafts. Should the working load increase to a value where at the take-off shaft is stationary, then the casing will rotate at a maximum speed and the input will merely drive the casing, a condition of netural having been reached. If the casing is made to rotate faster than the maximum speed by additional drive means (not shown) then the take-off shaft will be driven in the opposite direction to the input shaft.

Hence, if the take-off shaft of the assembly is connected to drive a heavy load (for example, a flywheel) the driving engine connected to the input shaft may be started at its optimum speed initially and the assembly will gradually increase the speed of the flywheel until it is rotating at the desired maximum speed. Accordingly, the assembly may be used as an automatic transmission in a motor vehicle wherein the input shaft would be connected to the engine via a conventional clutch and the take-off shaft being connected so as to drive the wheels of the vehicle, the clutch not being essential but being incorporated as a means of disconnecting the drive from the engine to the assembly.

Another use of the assembly arises from the fact that if the load to be driven does not generate via take-off shaft 12 the gear cluster 19 a torque greater than that developed by the input shaft, the load will immediately be driven at maximum speed. Thus the assembly may be used in the driving mechanism of say a drill such as the type used to drill boreholes. Before drilling the drill bit begins to rotate at maximum speed but on boring the speed of the drill will be automatically varied by the assembly to compensate for the resistance of the material being drilled. Thus, if the material being drilled offers too much resistance to the drill the assembly may automatically allow the drill to stop rotating whilst the drive motor continues at its normal speed.

It will be appreciated that in cases where large loads are encountered, e.g. in locomotive drive systems, several assemblies may be connected in series in order to accommodate the required loadings.

What I claim is:

1. A transmission assembly comprising an input shaft and a take-off shaft in co-axial alignment, a gear carrying member rotatably mounted on the input and take-off shafts, a first gear fixedly mounted on the input shaft and a second gear fixedly mounted on the take-off shaft, a control gear co-axial with the input and take-off shafts and mounted for rotation relative thereto, a first gear train rotatably carried by the gear carrying member and arranged to provide a driving connection between the first gear and the control gear and a second gear train rotatably carried by the gear carrying member and arranged to provide a driving connection between the control gear and the second gear, the first and second gear trains being arranged to rotate the gear carrying member in opposite directions for a given direction of rotation of the input shaft, the first gear, first gear train and control gear being so sized to form a step down in rotational speed from the first gear to the control gear, and the control gear, second gear train and second gear being so sized to form a step up in rotational speed from the control gear to the second gear, the gear sizes being such that the amount of step up is greater than the amount of step down, the arrangement being such that for a given speed of rotation of the input shaft the assembly automatically adjusts the speed of rotation of the take-off shaft between a maximum and a minimum speed of revolution in accordance with load applied to the take-off shaft.

2. A transmission assembly according to claim 1 wherein the control gear is positioned between the first and second gears.

3. A transmission assembly according to claim 2 wherein the control gear is rotatably mounted on an extension of either the input or take-off shaft.

4. A transmission assembly according to claim 1 wherein the control gear comprises two differently sized gears connected to one another so as to rotate in unison.

5. A transmission assembly according to claim 4 wherein the first gear train and second gear train each comprise two differently sized gears connected to one another so as to rotate in unison about a common axis.

6. A transmission assembly according to claim 5 wherein for the first gear train one of the differently sized gears meshes with the first gear and the other meshes with the one of the gears of control gear, and wherein for the second gear train one of the differently sized gears meshes with the other gear of the control gear and the other meshes with the second gear, the relative gear sizes of the meshing gears of the first gear train and control gear being about 30:35 and the relative gear sizes of the meshing gears of the control gear and the second gear train being about 38:27.

7. A transmission assembly according to claim 6 wherein the relative gear sizes of the first gear and the gear of the first gear train with which it meshes is about 33:32, and the relative gear sizes of the second gear and the gear of the second gear train with which it meshes is about 32.33.

8. A transmission assembly for a motor powered vehicle comprising an input shaft for connection to the motor and a take-off shaft for connection to the driven shaft of the vehicle, the take-off shaft being in co-axial alignment with the input shaft, a gear carrying member rotatably mounted on the input and take-off shafts, a first gear fixedly mounted on the input shaft and a second gear fixedly mounted on the take-off shaft, a control gear co-axial with the input shaft and rotatable relative thereto, a first gear train rotatably carried by the gear carrying member and arranged to provide a driving connection between the first gear and the control gear and a second gear train rotatably carried by the gear carrying member and arranged to provide a driving connection between the control gear and the second gear, the first and second gear train being arranged to rotate the gear carrying member in opposite directions for a given direction of rotation of the input shaft, the first gear, first gear train and control gear being so sized to form a step down in rotational speed from the first gear to the control gear, and the control gear, second gear train and second gear being so sized to form a step up in rotational speed from the control gear to the second gear, the gear sizes being such that the amount of step up is greater than the amount of step down, the arrangement being such that for a given speed of rotation of the input shaft the assembly automatically adjusts the speed of rotation of the take-off shaft between a maximum and a minimum speed of revolution in accordance with load applied to the take-off shaft.

9. A transmission assembly according to claim 2 wherein the control gear comprises two differently sized gears connected to one another so as to rotate in unison.

10. A transmission assembly according to claim 9 wherein the first gear train and second gear train each comprise two differently sized gears connected to one another so as to rotate in unison about a common axis.

11. A transmission assembly according to claim 10 wherein for the first gear train one of the differently sized gears meshes with the first gear and the other meshes with the one of the gears of control gear, and wherein for the second train one of the differently sized gears meshes with the other gear of the control gear and the other meshes with the second gear, the relative gear sizes of the meshing gears of the first gear train and control gear being about 30:35 and the relative gear sizes of the meshing gears of the control gear and the second gear train being about 38:27.

12. A transmission assembly according to claim 11 wherein the relative gear sizes of the first gear and the gear of the first gear train with which it meshes is about 33:32, and the relative gear sizes of the second gear and the gear of the second gear train with which it meshes is about 32:33.

13. A transmission assembly according to claim 3 wherein the control gear comprises two differently sized gears connected to one another so as to rotate in unison.

14. A transmission assembly according to claim 13 wherein the first gear train and second gear train each comprise two differently sized gears connected to one another so as to rotate in unison about a common axis.

15. A transmission assembly according to claim 14 wherein for the first gear train one of the differently sized gears meshes with the first gear and the other meshes with the one of the gears of control gear, and wherein for the second gear train one of the differently sized gears meshes with the other gear of the control gear and the other meshes with the second gear, the relative gear sizes of the meshing gears of the first gear train and control gear being about 30:35 and the relative gear sizes of the meshing gears of the control gear and the second gear train being about 38:27.

16. A transmission assembly according to claim 15 wherein the relative gear sizes of the first gear and the gear of the first gear train with which it meshes is about 33:32, and the relative gear sizes of the second gear and the gear of the second gear train with which it meshes is about 32:33.

* * * * *